Oct. 27, 1925.
R. WOODS ET AL
1,559,493
GRID LEAK RESISTANCE
Filed Aug. 8, 1924
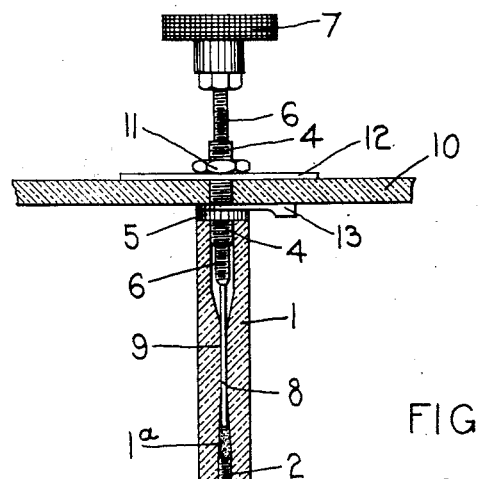
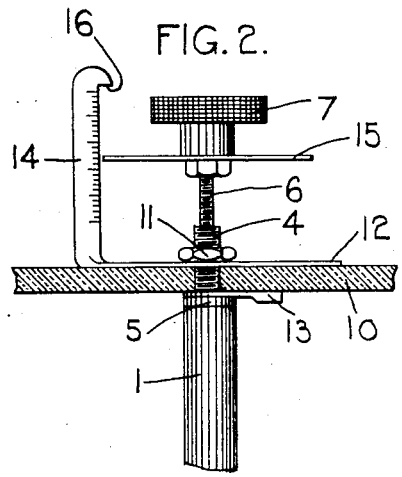
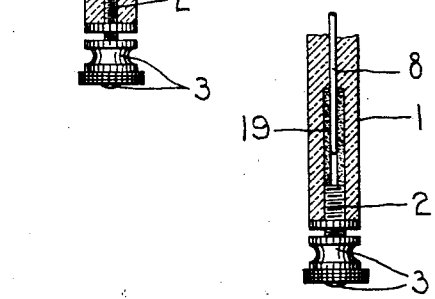
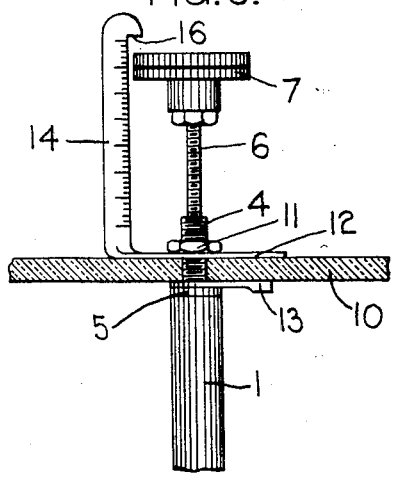
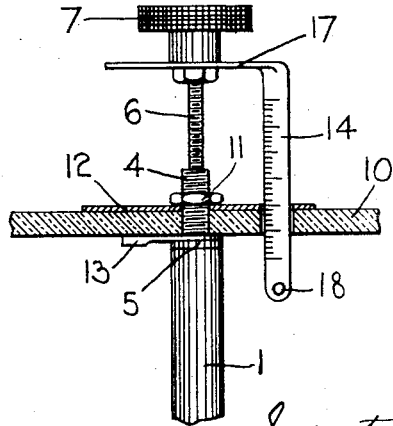
Inventors
Rudolf Woods, and
William H. LeBreton
by Herbert W. Jenner.
Attorney.

Patented Oct. 27, 1925.

1,559,493

UNITED STATES PATENT OFFICE.

RUDOLF WOODS AND WILLIAM HENRY LE BRETON, OF LONDON, ENGLAND.

GRID-LEAK RESISTANCE.

Application filed August 8, 1924. Serial No. 730,908.

*To all whom it may concern:*

Be it known that we, RUDOLF WOODS, a citizen of the Austrian Republic, residing at London, England, and WILLIAM HENRY LE BRETON, a citizen of the United States of America, residing at London, England, have invented a certain new and useful Improved Grid-Leak Resistance, and we do hereby declare the following to be a full, clear, and exact description of the invention, such as will enable others skilled in the art to which it appertains to make and use the same.

This invention relates to an improved construction of variable grid leak for use in wireless telegraphy and telephony and has for its object to construct, in an improved and simple manner, an efficient grid leak the resistance of which can be finely varied as desired from practically nothing to the maximum ordinarily required.

According to the invention the improved grid leak comprises a tubular container of vulcanite or other suitable non-conducting material, a metal contact piece or plug closing one end of said container, an internally screwed socket or sleeve closing the other end of said container, a metal contact pin screwed through the said socket or sleeve, powdered graphite or other suitable material within said container, and means such as an operating knob on the outer end of said contact pin whereby it can be rotated to move its inner end towards and away from the said contact piece or plug for the purpose of varying the resistance of the leak. The container is formed intermediate of its ends with a part of restricted bore between which and the contact piece or plug the graphite or other filling is located, the adjustable contact pin fitting the said part of restricted bore with sufficient tightness to prevent the passage of the graphite or other filling past said part.

Fig. 1 of the accompanying illustrative drawings shows in sectional elevation one construction of grid leak embodying the invention.

Figs. 2, 3 and 4 show in elevation the upper end of the improved grid leak associated with means for indicating the extent of endways movement of the adjustable screwed pin thereof.

Fig. 5 is a section of the lower end of the improved grid leak illustrating a modification.

The improved grid leak, as illustrated in Fig. 1, comprises a container, consisting of a tube 1 of vulcanite or other suitable non-conducting material, closed at one end by a contact piece in the form of a stud 2 formed in one with a terminal 3. Fixed as by screwing in the other end of the tube 1 is a screwed sleeve 4 that is formed with a flange 5 that bears on the end of the tube 1. The sleeve 4 is internally screw threaded and extending therethrough is a correspondingly screwed contact pin 6 the upper or outer end of which is furnished with a knob 7 of insulating material and from the other end of which there projects towards the stud 2 a plain unscrewed extension 8 of the pin 6. At a part 9 intermediate of its ends, the bore of the tube 1 is such as to somewhat tightly fit the pin extension 8, but between the part 9 and the end closing stud 2, the bore $1^a$ of the tube 1 gradually increases in diameter from the point 9 to the said stud.

In Fig. 1 the grid leak is shown as fixed to a panel 10 and it will be seen that this fixing is very simply effected by forming in the panel a hole through which the sleeve 4 extends, a nut 11 screwed on said sleeve and bearing upon the panel or, as shown, upon a metal or other disc 12 that rests upon the panel is then tightened up so that the panel is gripped between the flange 5 of the sleeve and the disc 12.

The length of the adjustable contact pin 6 with its extension 8 is such that in one extreme position of the adjustable pin the end of the extension 8 thereof makes contact with the stud 2. The bore $1^a$ of the tube 1 is filled with a leakage medium such as powdered graphite or other suitable material such for example as bichromate of potash, or a paste of slate powder in oil, or india ink, the said filling being confined in the tapered portion $1^a$ of the said bore by the restricted part 9 through which it cannot pass so long as the pin extension 8 is not withdrawn completely past the said part 9.

When the grid leak is in use it is included in the circuit by a connection at the terminal 3 and a connection to the sleeve 4 which may be effected through a forked connection tag 13 grippel between the underside of the panel 10 and the flange 5 of the said sleeve. When the pin extension 8 bears on the stud 2 the circuit is directly completed practically without any resistance but upon manipulation of the knob 7 so as to move the pin extension 8 away from the stud 2 the circuit is completed through the graphite or other filling in the bore 1ª of the tube 1 and consequently the said filling presents a resistance that is variable by adjustment of the pin relatively to the stud 2. The resistance is greatest when the pin end is furthest from the stud 2 and as it is moved towards the stud 2 the resistance is reduced by the consequent compression of the graphite or other filling towards the stud 2, by the approach of the pin towards the said stud, and by the increasing body of the filling between the pin and the wall of the tube owing to its bore increasing towards the said stud.

In order to prevent complete withdrawal of the adjustable contact pin after the tube 1 has been charged with the filling material and the stud 2 inserted, the free end of the said pin may be slightly bent over, flattened or enlarged.

The improved grid leak may be provided with a scale or equivalent member whereby the extent of the endways movements of the adjustable pin 6, 8 can be readily determined so that, by reference to the scale or equivalent, the adjustment of the grid leak can be effected as desired or according to requirements with certainty. The scale or equivalent member may be fixed adjacent to a pointer or part that is moved simultaneously with the adjustable pin, or it may move with the said pin adjacent to a relatively fixed part.

With advantage the scale or equivalent consists of a member that is also adapted to limit the outward movement of the adjustable pin so that possibility of withdrawing the said rod to an extent liable to impair the efficient working of the grid leak is avoided.

Fig. 2 illustrates an arrangement in which a scale in the form of a calibrated arm 14 extends upwardly from the metal disc 12. Secured on the adjustable pin 6 is a disc 15 the edge of which travels adjacent to the inner face of the upwardly extending arm 14 as the pin is moved upwardly and outwardly. At its upper end the arm 14 is formed with an inwardly extending tooth 16 that forms a stop that limits the outward movement of the disc 15 that moves with the pin and consequently the pin is prevented from being moved outwardly beyond the amount desired. If desired the disc 15 on the screwed pin 6 may move endways therewith but not rotate and in such a construction the said disc may be formed with a notch that engages the calibrated scale arm 14.

In a modification shown in Fig. 3, the disc 15 is dispensed with and the upwardly extending arm 14 is located in proximity to the periphery of the operating knob 7 on the adjustable pin. In such case the extent of adjustment can be readily seen by reference to the position of the knob relatively to the scale on the arm, or, to facilitate the reading, the said knob may have a distinctive circumferential line drawn around its periphery, as shown.

In a further modification instead of a single upwardly extending arm 14 there may be two or more and if desired these may be united at their outer ends to provide a guard that would prevent complete withdrawal of the adjustable pin.

In some cases instead of the calibrated arm 14 being fixed, it may extend downwardly from a disc or arm 17 that moves endways with but does not rotate on the adjustable pin 6, as shown in Fig. 4. In such case the calibrated arm 14 is arranged to extend through a suitable hole formed therefor in the panel 10 and its lower end, below the panel, could be fitted with a pin or stop 18 to limit outward movement. As the arm 14 is calibrated at one or both sides or edges the adjustment can be readily seen as the arm moves in and out of the hole in the panel.

In order to avoid any possibility of the leakage filling creeping along the adjustable pin to the exterior there may be fitted in the bore of the tube 1 a thin liner of absorbent fibrous material permeated with the filling medium. Fig. 5 illustrates such a construction, 19 indicating the absorbent liner. For the sake of clearness the said liner is shown thicker than is actually the case in practice.

It is to be noted that the invention is not limited to the special examples described as numerous modifications may be made in constructive details.

What we claim is:

1. A grid leak, comprising a tubular container having a restricted bore at a predetermined part between its ends, a contact plug closing one end of the container, resistance material inclosed in the container between the restricted part and the contact plug, an internally screwthreaded member closing the other end of the container, and a screwthreaded contact pin engaging with the screwthreaded member and provided with an extension which fits in the said restricted part and bears on the resistance material.

2. A grid leak as set forth in claim 1, the bore of the container around the resistance material being arranged to increase gradually in cross-section from the restricted part to the plug.

3. A grid leak as set forth in claim 1, the bore of the container around the resistance material being provided with a liner of absorbent material.

4. A grid leak as set forth in claim 1, the said internally screwthreaded member being provided with a flange between its ends which bears on the end of the container, and means for securing the exposed end portion of the said member to a support.

In testimony whereof we affix our signatures.

RUDOLF WOODS.
WILLIAM HENRY LE BRETON.